(12) United States Patent
Stone et al.

(10) Patent No.: US 8,296,357 B2
(45) Date of Patent: Oct. 23, 2012

(54) SYSTEMS AND METHODS FOR REMOTING MULTIMEDIA PLUGIN CALLS

(75) Inventors: David Stone, Lauderdale By-the-Sea, FL (US); Juan Rivera, Doral, FL (US); Modesto Tabares, Miramar, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 435 days.

(21) Appl. No.: 12/468,797

(22) Filed: May 19, 2009

(65) Prior Publication Data
US 2009/0287772 A1    Nov. 19, 2009

Related U.S. Application Data

(60) Provisional application No. 61/054,325, filed on May 19, 2008.

(51) Int. Cl.
*G06F 15/16* (2006.01)
(52) U.S. Cl. ......... 709/203; 709/206; 709/231; 719/315
(58) Field of Classification Search .................. 709/203, 709/206, 231, 293; 719/315
See application file for complete search history.

(56) References Cited

U.S. PATENT DOCUMENTS

| | | | | |
|---|---|---|---|---|
| 6,078,322 | A * | 6/2000 | Simonoff et al. | 715/744 |
| 6,964,052 | B1 * | 11/2005 | Korenshtein et al. | 719/319 |
| 7,695,370 | B2 * | 4/2010 | Liu et al. | 463/42 |
| 7,716,360 | B2 * | 5/2010 | Angelov | 709/231 |
| 2002/0069396 | A1 * | 6/2002 | Bhattacharya et al. | 716/7 |
| 2002/0122060 | A1 * | 9/2002 | Markel | 345/760 |
| 2002/0165993 | A1 * | 11/2002 | Kramer | 709/315 |
| 2003/0154239 | A1 * | 8/2003 | Davis et al. | 709/201 |
| 2004/0143625 | A1 * | 7/2004 | Sheinis et al. | 709/202 |
| 2006/0070090 | A1 * | 3/2006 | Gulkis | 719/328 |
| 2007/0180448 | A1 * | 8/2007 | Low et al. | 718/1 |
| 2008/0046531 | A1 * | 2/2008 | Shtivelman et al. | 709/206 |
| 2008/0186377 | A1 * | 8/2008 | Eriksson et al. | 348/14.01 |

OTHER PUBLICATIONS

International Preliminary Report on Patentability for PCT/US2009/044566 dated Dec. 2, 2010.
Written Opinion of the International Searching Authority for PCT/US2009/044566 dated Dec. 2, 2010.

* cited by examiner

*Primary Examiner* — Tesfay Yohannes
(74) *Attorney, Agent, or Firm* — Foley and Lardner LLP; John D. Lanza

(57) ABSTRACT

Described are methods and systems for remotely providing calls issued to a multimedia plugin. A proxy plugin executing on a server can intercept calls issued by a container application on the server, to a multimedia plugin. The proxy plugin can then transmit the intercepted call to a plugin executing on a client. The multimedia plugin on the client can receive the call issued by container application and responsively generate graphical or multimedia content. Upon generating the multimedia or graphical content, the multimedia plugin can display the generated content within a plugin window on the client. In some instances, the proxy plugin responds to the call issued by the container application rather than forward the call to the multimedia plugin. In those instances, the proxy plugin retrieves content from cache and responds to the container application call with the retrieved content.

38 Claims, 12 Drawing Sheets

SYSTEMS AND METHODS FOR REMOTING MULTIMEDIA PLUGIN CALLS

RELATED APPLICATIONS

This U.S. patent application claims priority to U.S. Provisional Patent Application Ser. No. 61/054,325, filed on May 19, 2008, the disclosure of which is considered part of the disclosure of this application and is herein incorporated by reference in its entirety.

FIELD OF THE INVENTION

This application generally relates to providing remote access to computing resources. In particular, this application relates to systems and methods for providing remote access or enabling remote execution of multimedia plugins.

BACKGROUND OF THE INVENTION

Some remote presentation systems execute applications on a centrally hosted server and send the graphical or audio output of those applications to remotely located client devices. For many applications, such as word processors for example, the consumption of server resources is relatively low. This results in a relatively light load on the server's CPU and light level of network traffic generated by the application. Such applications can therefore be hosted on a single server since they do not cause significant performance degradation by demanding a lot of network bandwidth or server processing capabilities, such as a high number of server's CPU cycles for example. However, applications which deal with large media files, such as video, animation or audio applications, consume significantly more resources and bandwidth resulting in delays and degradation of user experience.

Some systems provide remote access to graphical plugins between the server and the client by lowering the graphical output. Other remote presentation systems relocate the rendering of video from the server machine to the client machine. These systems, however, cannot be used to provide remote access to graphical plugins and applications that share a complex interface. Such systems also cannot be used to enable remote execution of plugins executing graphical content. Other systems provide remote access to applications that are made to be streamed or shared between machines, and not applications designed to be executed fully on a single machine.

A need exists to enable users of remote access systems to run resource demanding applications, not designed to be remotely accessed or controlled on centrally hosted servers without sacrificing user experience, quality of the graphical output or severely degrading server scalability.

SUMMARY OF THE INVENTION

In its broadest interpretation, the methods and systems described herein are embodiments of methods and systems for remoting multimedia plugins. There exist many applications or plugins that are resource intensive and therefore use a significant amount of computing resources when they execute. Servers that host applications which are remotely accessed by users via clients, may have to execute many instances of these resource intensive applications which degrades the performance of the servers and consumes a large amount of bandwidth when remotely provided to client machines. There exists a need for methods and systems for remotely providing access to these resource intensive applications without utilizing a great deal of a servers' resources. Described herein are methods and systems for remotely providing multimedia plugin calls to a substantially similar multimedia plugin executing on a client. Remoting the call to the plugin executing on the client eliminates the need for the plugin to execute on the server, thereby providing the plugin content to the client while simultaneously reducing the strain on the server's resources.

In one instance, described herein is an embodiment of a method for remoting multimedia plugin calls from a server to a client. A proxy multimedia plugin executing on a server and corresponding to a multimedia plugin executing on a client, intercepts a call issued by a container application executing on the server. The issued call requests content from the multimedia plugin. The proxy multimedia plugin determines whether the proxy multimedia plugin can respond to the call, and transmits the call to the multimedia plugin executing on the client responsive to determining that the proxy multimedia plugin cannot respond to the call. The multimedia plugin on the client responds to the call by generating graphical content and displaying the graphical content.

In one embodiment, the method includes a delivery application executing on the server to transmit the call from the server to the client. In another embodiment, the call is transmitted from the server to a proxy container application executing on the client. The proxy container application, upon receiving the call, can issue the call to the multimedia plugin executing on the client.

Displaying the graphical content can, in some embodiments, include displaying the graphical content in a plugin window on the client.

Requesting content from the multimedia plugin can, in some embodiments, include requesting access to a multimedia plugin interface within the multimedia plugin.

In some embodiments, the method includes transmitting the call or any request over a virtual channel between the server and the client via a presentation level protocol. In other embodiments, determining the proxy multimedia plugin can respond to the call can result in the proxy multimedia plugin responding to the container application call with the requested content. The requested content, in some embodiments, can include content stored in cache on the server.

In other embodiments, the proxy container application can intercept a call issued by the multimedia plugin, where the call requests content from the container application. The proxy container application can determine that the proxy container application can respond to the issued call, and the proxy container application can respond to the multimedia plugin call with the requested content. In some embodiments, the requested content includes content stored in cache on the client.

The multimedia plugin, in some embodiments, can generate multimedia content. In other embodiments, the multimedia plugin displays multimedia content. The multimedia plugin can in some embodiments be a control, while in other embodiments, the proxy multimedia plugin is a proxy control.

In one embodiment, the proxy multimedia plugin obtains window data associated with the proxy multimedia plugin, and transmits the window data to the multimedia plugin on the client. The multimedia plugin then receives the transmitted window data, and alters at least one interface between the multimedia plugin and the proxy container based on the received window data.

In some embodiments, the proxy multimedia plugin obtains a scripting interface generated by a script within the container application, and transmits the scripting interface to the proxy container application. In other embodiments, the proxy container application obtains a scripting interface generated by a script within the multimedia plugin, and transmits the scripting interface to the proxy multimedia plugin. Intercepting a call, in some embodiments, includes intercepting a call for a scripting interface.

In one embodiment, the multimedia plugin accesses network resources via a browser application executing on the client, and downloads the accessed network resources to the multimedia plugin.

In other embodiments, a request for network resources generated by the multimedia plugin is intercepted and redirected to the server over a virtual channel between the client and the server via a presentation level protocol. The requested resources from the server are received and forwarded to the multimedia plugin.

In some aspects the processes and methods described above can be carried out by a computer readable medium having instructions executable by a processor to carry out the above-described methods.

In other aspects, described herein is a system for remoting multimedia plugin calls from a server to a client. The system includes a server executing a container application and a proxy multimedia plugin corresponding to a multimedia plugin executing on a client. The proxy multimedia plugin can: intercept a call issued by the container application, the call requesting content from the multimedia plugin; determine whether the proxy multimedia plugin can respond to the call; and transmit the call, responsive to determining the proxy multimedia plugin cannot respond to the call, to the multimedia plugin. The multimedia plugin can receive the call, and generate graphical content responsive to receiving the call. The multimedia plugin can also display the graphical content

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
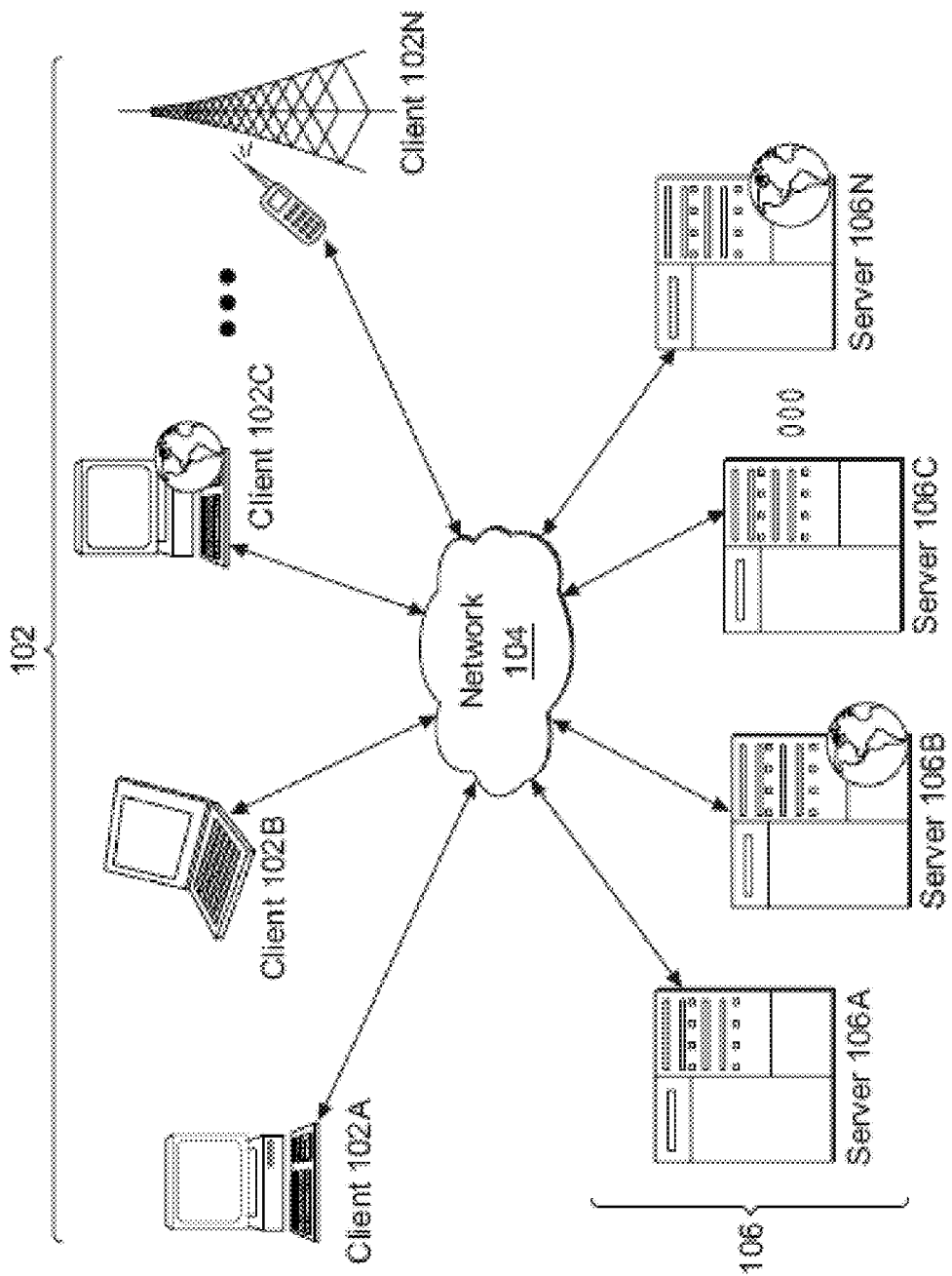
FIG. 1A depicts embodiments of network environments that provide remote access to computing devices that can execute application programs.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106 in some embodiments may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent;

different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
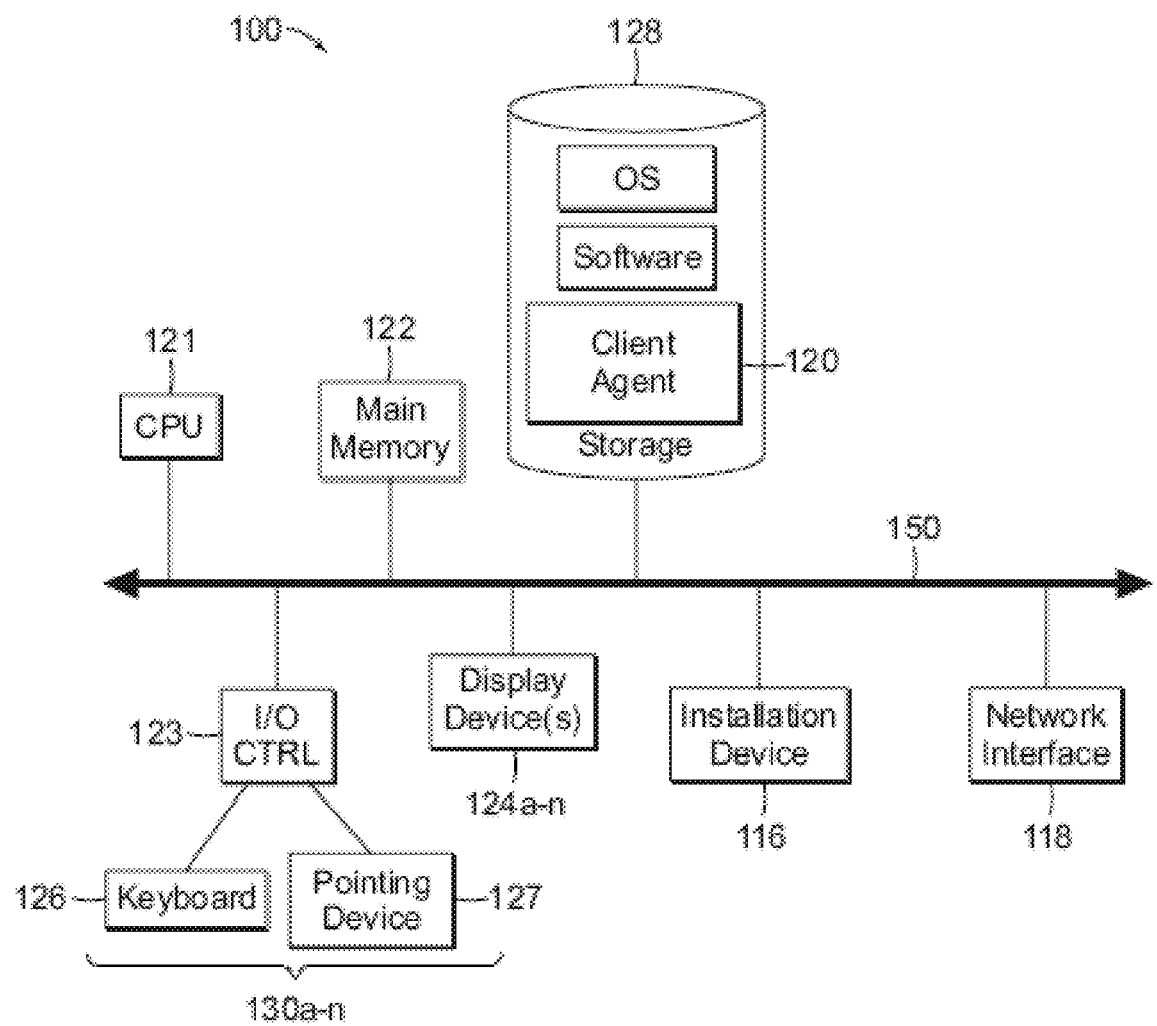
FIG. 1B and FIG. 1C depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
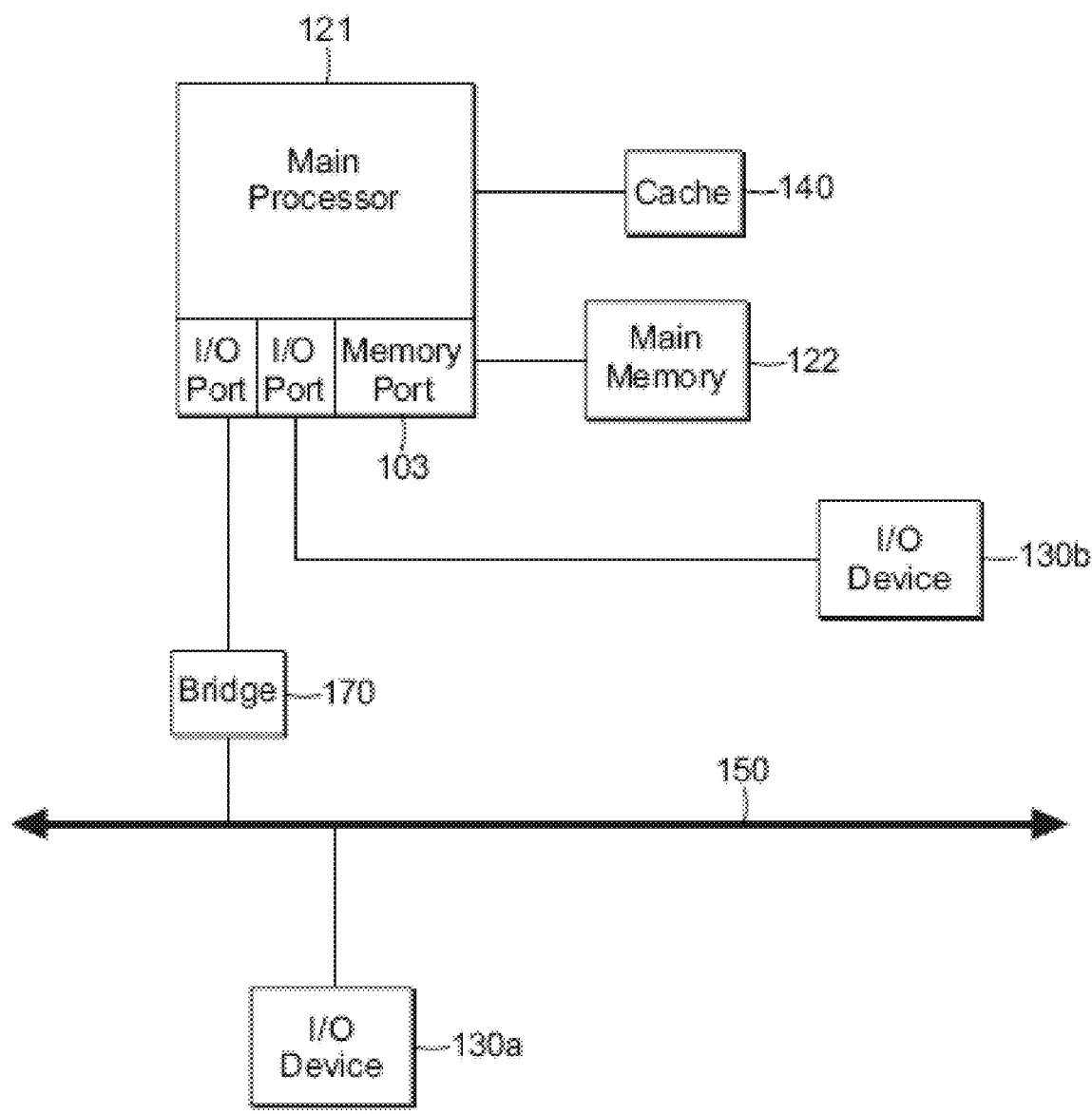

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
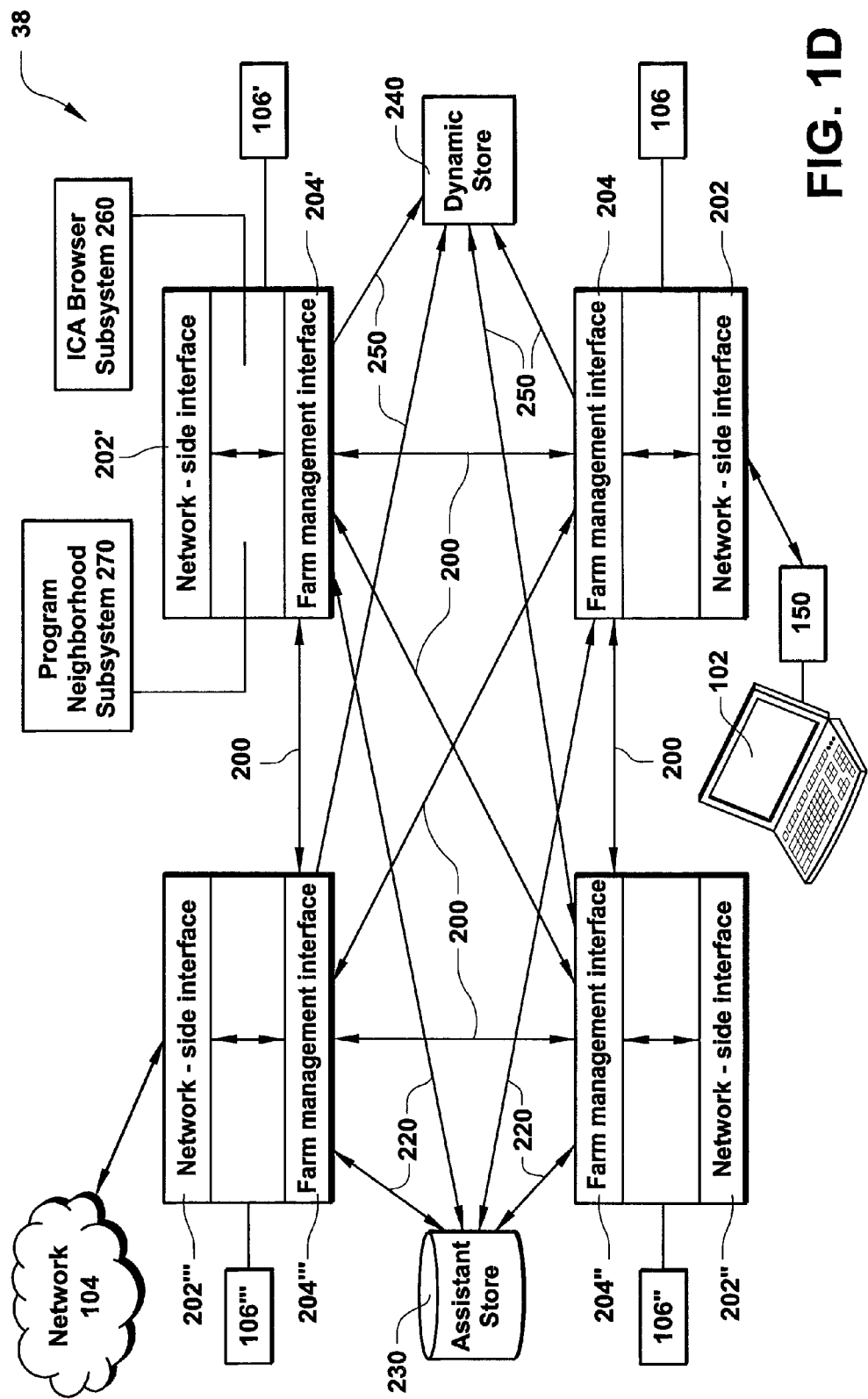
FIG. 1D illustrates a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that does not change frequently, i.e., data that changes only on an hourly, daily, or weekly basis, or data that never changes. Each server uses a persistent storage subsystem to read data from and write data to the persistent store 230.

The data stored by the persistent store 230 may be replicated for reliability purposes either physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 2:
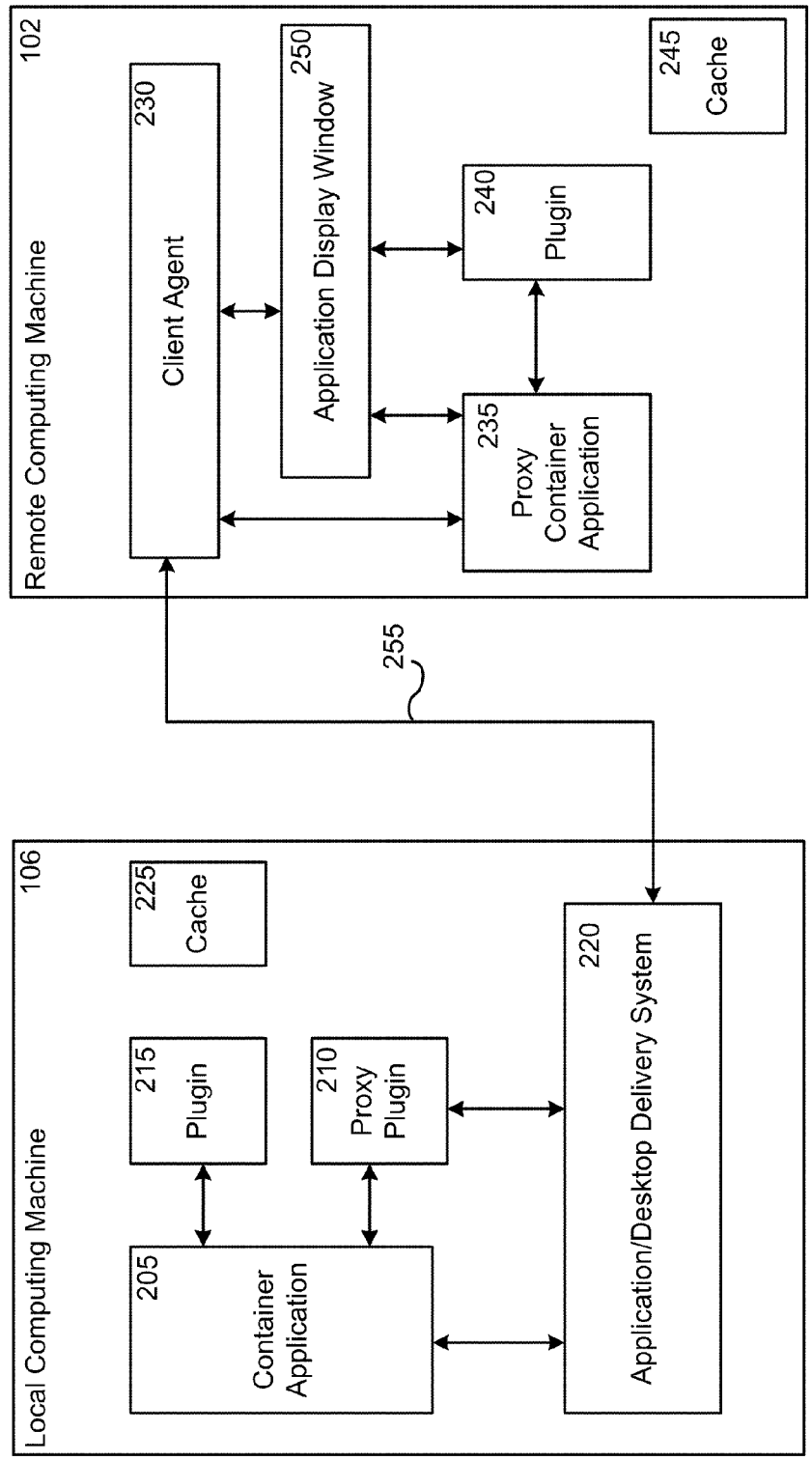
FIG. 2 illustrates a block diagram depicting an embodiment of a system for remoting multimedia plugin calls.

Illustrated in FIG. 2 is a block diagram depicting an embodiment of a system for remoting multimedia plugins. The system can include a local computing machine 106 communicating with a remote computing machine 102 over a virtual communication channel 255 and via a presentation level protocol. Executing on the local computing machine 106 is a container application 205, a plugin 215 and a proxy plugin 210, where the plugin 215 and the proxy plugin 210 can communicate with the container application 205. Communicating with the container application 205 and the proxy plugin 210 is an application/desktop delivery system 220 that can communicate over the virtual communication channel with a client agent 230 executing on the remote computing machine 102. An application display window 250 and proxy container application 235 communicate with the client agent 230. The proxy container application 235 also communicates with the application display window 250 and a plugin 240. Included on both the local and remote computing machines 106, 102 is cache 225, 245 memory.

Further referring to FIG. 2, and in more detail, in one embodiment the local computing machine 106 can be any of the computing machines described above. In one embodiment the local computing machine 106 is a server. In other embodiments, the local computing machine 106 can be referred to as either a first computing machine or a second computing machine. In some embodiments, the local computing machine 106 is a server 106 that can be any one of an application server, a server within a server farm or any other type of server able to provide content to clients connected to the server 106. The local computing machine 106, in most embodiments, can communicate with the remote computing machine 102 over a network 104 such as any of the networks described herein.

The remote computing machine 102 can in some embodiments, be any one of the computing machines described above. In one embodiment, the remote computing machine 102 is a client 102, while in other embodiments the remote computing machine 102 can be either one of a first computing machine or a second computing machine. In some embodiments, the client 102 can be a hand-held computing device such as any of the hand-held devices described herein. The remote computing machine 102 can communicate with the local computing machine 106 over a network 104 such as any of the networks described herein.

In some embodiments, the virtual communication channel 255 is an ICA channel. Thus in these embodiments, communication between the local computing machine 106 and the remote computing machine 102 over the virtual communication channel 255 takes place using a presentation level protocol such as the ICA protocol created by CITRIX SYSTEMS. In some embodiments, the local computing machine 106 and the remote computing machine 102 can communicate via RDP, PCAnywhere, or any other presentation level protocol. The virtual communication channel 255 can be established, in some embodiments, over a network 104 such as any of the networks described herein. The communication channel 255 can be a virtual channel, a virtual communication channel, a channel, a virtual communication connection or any other communicative connection between the remote computing machine 102 and the local computing machine 106.

Communication over the virtual communication channel 255 can be facilitated by an application/desktop delivery system 220 and a client agent 230. The application/desktop delivery system 220 executes on the local computing machine 106 and operates to route information from the local computing machine 106 to the remote computing machine 102 over the communication channel 255. In particular, the application/desktop delivery system 220 can receive graphical application output from the container application 205 and transmit the graphical application output to the client agent 230 executing on the remote computing machine 102. The client agent 230 can then display the received graphical application output in the application display window 250 executing on the remote computing machine 102. In some embodiments, the application/desktop delivery system 220 can receive calls, requests and other information from the proxy plugin 210 on the local computing machine 106 and transmit the calls, requests and other information to the client agent 230 which relays the call, request or information to the proxy container application 235.

While FIG. 2 illustrates an application/desktop delivery system 220 that communicates with the container application 205, other embodiments include an application/desktop delivery system 220 that receives graphical application output from any number of applications executing on the local computing machine 106. The application/desktop delivery system 220 receives the graphical application output and transmits the output to the client agent 230 which then forwards the output to the appropriate application display window 250 where the output is displayed.

In some embodiments, the application/desktop delivery system 220 communicates with other applications or storage repositories on the local computing machine 106. The proxy plugin 210, in one embodiment, can forward to the application/desktop delivery system 220 any of: a call issued by the plugin 216; a request for media or multimedia content issued by the container application 205; window information obtained by the proxy plugin 210; a scripting interface obtained by the proxy plugin 210; graphical output stored in cache 225; graphical commands or window information stored in cache 225; and any other stored information or requests issued by objects executing on the local computing machine 106. The application/desktop delivery system 220 can transmit any of the received stored information, received commands or requests to the client agent 230 executing on the remote computing machine 102. In one embodiment, the remote computing machine 102 can receive the information and either relay the information to an object executing on the remote computing machine 102 or display the graphical output in the application display window 250.

In one embodiment, a container application 205 executes on the local computing machine 106. This container application 205 can be any application described herein. In particular, the container application 205 can be: a browser application; a MICROSOFT OFFICE application; an ADOBE application; a GOOGLE application; a web application; a cloud application; an application executing on a computing machine remotely located from the local computing machine 106 (i.e. a third or fourth computing machine); or any other application able to execute a plugin and display the results of the plugin execution. For example, the plugin can be an INTERNET EXPLORER browser application executing a FLASH player.

The plugin 215, in some embodiments, can be an ACTIVEX control such as a FLASH player. The plugin 215 can also be any one of: an ACTIVEX application or control; a JAVA applet; an ACTIVEX DATA OBJECT; a DIRECT SHOW object; ACTIVE scripting; and any other embedded or linked control or sub-application able to operate within the methods and systems described herein. In one embodiment, the plugin 215 executes within the context of the container application 205. In other embodiments the plugin 215 is linked to the container application 205 such that the plugin 215 executes as though it were included within the container application 205. While FIG. 2 depicts a local computing machine 106 having a plugin 215, in some embodiments the local computing machine 106 does not execute or otherwise have a plugin 215.

The plugin 240 on the remote computing machine 102 can, like the plugin 215, be an ACTIVEX control such as a FLASH player. The plugin 240 can also be any one of: an ACTIVEX application or control; a JAVA applet; an ACTIVEX DATA OBJECT; a DIRECT SHOW object; ACTIVE scripting; and any other embedded or linked control or sub-application able to operate within the methods and systems described herein. In one embodiment the plugin 240 is associated with or linked to the proxy container application 235. In other embodiments the plugin 240 executes as though it were included within the proxy container application 235.

The proxy plugin 210, in some embodiments, corresponds to the plugin 215. In other embodiments, the proxy plugin 210 corresponds to the plugin 240 executing on the remote computing machine 102. The proxy plugin 210 can install itself on the local computing machine 106 much the same way that a plugin would install itself on a computing machine. By doing this, the proxy plugin 210 is treated by the operating system on the local computing machine 106 and more importantly by the container application 205 like a fully installed plugin application. Each time the container application 205 issues requests or calls to the plugin corresponding to the proxy plugin 210, the proxy plugin 210 can intercept the request or call and either respond to the request or call, or relay the request or call to a plugin 240 executing on the remote computing machine 102. The proxy plugin 210 can correspond to the plugin 240 such that the proxy plugin 210 can represent any of: an ACTIVEX application or control; a JAVA applet; an ACTIVEX DATA OBJECT; a DIRECT SHOW object; ACTIVE scripting; and any other embedded or linked control or sub-application able to operate within the methods and systems described herein.

In some embodiments, the proxy plugin 210 is a plugin binary (i.e. a COM server *.dll file) that is installed on the local computing machine 106. By installing a plugin binary on the local computing machine 106, the proxy plugin 210 appears to the container application 205 as though the proxy plugin 210 were an actual plugin application. Thus, all calls to the plugin are re-routed, passed or otherwise proxied to the proxy plugin 210. For example, the container application 205 can be an INTERNET EXPLORER browser application executing a proxy plugin 210 that is a FLASH player. The FLASH player proxy plugin 210 intercepts calls to the FLASH player issued by a page executing within the INTERNET EXPLORER browser, and forwards the calls to the proxy container application 235 executing on the remote computing machine 102. The proxy container application 235, which corresponds to the INTERNET EXPLORER browser container application 205 executing on the local computing machine 106, issues the call to the plugin 240 on the remote computing machine 102. The plugin 240, a FLASH player on the remote machine 102, generates multimedia content based on the call and displays the content within a plugin window either on the remote computing machine 102 or within the application display window 250. The resulting page is an HTML page displaying FLASH content within an HTML page displayed on the remote computing machine 102, where the HTML page is generated on the local computing machine 106 and the FLASH content is generated on the remote computing machine 102.

In one embodiment, the proxy plugin 210 can gather and obtain window data associated with the container application 205 and the plugin 215 on the local computing machine 106. The container application 205, in one embodiment, executes within a container window on the local computing machine 106. This container window (Not Shown) can be associated with window data, such as: the position of the container window on a desktop; the size of the window; whether the container window is maximized or minimized; and any other window data relevant to the display of the container application 205. Similarly, there can be plugin window data associated with the display of the plugin content within the container application 205 and therefore within the container window. In some embodiments, the plugin window data can include: the position of the plugin's graphics region within the container window (i.e. the location within the container window where the plugin's output is displayed;) the size of the graphics region where the plugin's output is displayed; a clipping region associated with the plugin's graphical output region; and any other window data relevant to displaying the plugin output in the container window.

The proxy plugin 210, in some embodiments, can query the container application 205 for information about the plugin window data. This query, in one embodiment, can be an interface call issued by the proxy plugin 210 to the container application 205. Similarly, the query can in some embodiments be a query to the operating system executing on the local computing machine 106 for information regarding plugin window data. Responsive to this query, the container application 205 can transmit the plugin window data to the proxy plugin 210 which can then transmit the plugin window data to the plugin 240 on the remote computing machine 102. Once the remote plugin 240 receives the plugin window data, the plugin 240 can configure or compose itself in accordance with the container application 205 on the local computing machine 106. In some embodiments, the plugin window data can be transmitted to the remote plugin 240 via a remote presentation protocol, in other embodiments additional protocol commands are included within the window data so that the remote plugin 240 can receive and interpret the plugin window data.

The proxy plugin 210 can in some embodiments correspond to the plugin 240 executing on the remote computing machine 102. Each of the proxy plugin 210 and the plugin 240 can be referred to as a graphical plugin, a media plugin, a multimedia plugin, a remote plugin, or a local plugin. The plugin 210, 240 can generate any of the following types of content: graphical; multimedia; audio; video; media; or any other type of content able to be generated by a plugin application. The plugin 210, 240 can communicate with cache 225, 245 to retrieve graphical or multimedia content, or to retrieve other information requested by a container application 205. The plugin 210, 240 can communicate with other components of the computing machines including the operating system, a desktop application and any other applications executing on the computing machines.

In one embodiment, cache 225, 245 is included on the local computing machine 106 and the remote computing machine 102. The cache 225, 245 can comprise any storage repository able to store graphical content, multimedia content; window data; graphics commands and any other information or content used by the methods and systems described herein. The contents of the cache 225 on the local computing machine 106 can in some embodiments be identical to the contents of the cache 245 on the remote computing machine 106. In other embodiments, call responses or repetitively requested graphical or multimedia content, window data or scripting information can be stored in either cache 225, 245. The proxy plugin 210 or the proxy container application 235 can retrieve this content from cache 225, 245 and respond to calls issued by the container application 205 and/or the plugin 240 by retrieving the requested content from cache 225, 245.

Executing on the remote computing machine 102, in one embodiment, is an application display window 250. The application display window 250 can display graphical application output generated by applications executing on the local computing machine 106 and transmitted to the application display window 250 over the virtual channel 255. In one embodiment, the proxy container application 235 communicates with the application display window 250 such that the proxy container application 235 forwards plugin 240 output to the application display window 250 for display.

The proxy container application 235 can correspond to the container application 205 executing on the local computing machine 106 such that the proxy container application 235 represents substantially the same application as the container application 205. In one embodiment, the proxy container application 235 can register with an operating system executing on the remote computing machine 102 so that the proxy container application 235 appears as though it is a full install of the container application. In such an embodiment, the proxy container application 235 can be an executable binary that executes on the remote computing machine 102 either as a separate process controlled by the client agent 230 or as a part of the client agent 230. Installing the proxy container application 235 as though it were a full install of the container application allows the plugin 240 on the remote computing machine 102 to interact with the proxy container application 235 as though the proxy container application 235 were the container application 205.

In some embodiments, the proxy container application 235 and the proxy plugin 210 contain the same COM and DCOM interfaces as the container application 205 and the plugin 240. Thus calls issued by the container application 205 to COM and DCOM interfaces on the plugin 240 can be similarly issued to the COM and DCOM interfaces on the proxy plugin 210. Conversely, calls issued by the plugin 240 to the COM and DCOM interfaces on the container application 205 can be similarly issued to the COM and DCOM interfaces on the proxy container application 235.

In most embodiments, the proxy container application 235, the container application 205, the plugin 240 and the proxy plugin 210 can use MICROSOFT COM and DCOM technology to issue and receive calls. In other embodiments, the proxy container application 235, the container application 205, the plugin 240 and the proxy plugin 210 can use another inter-process or inter-application communication standard able to relay messages from one object to another.

Figure 3A:
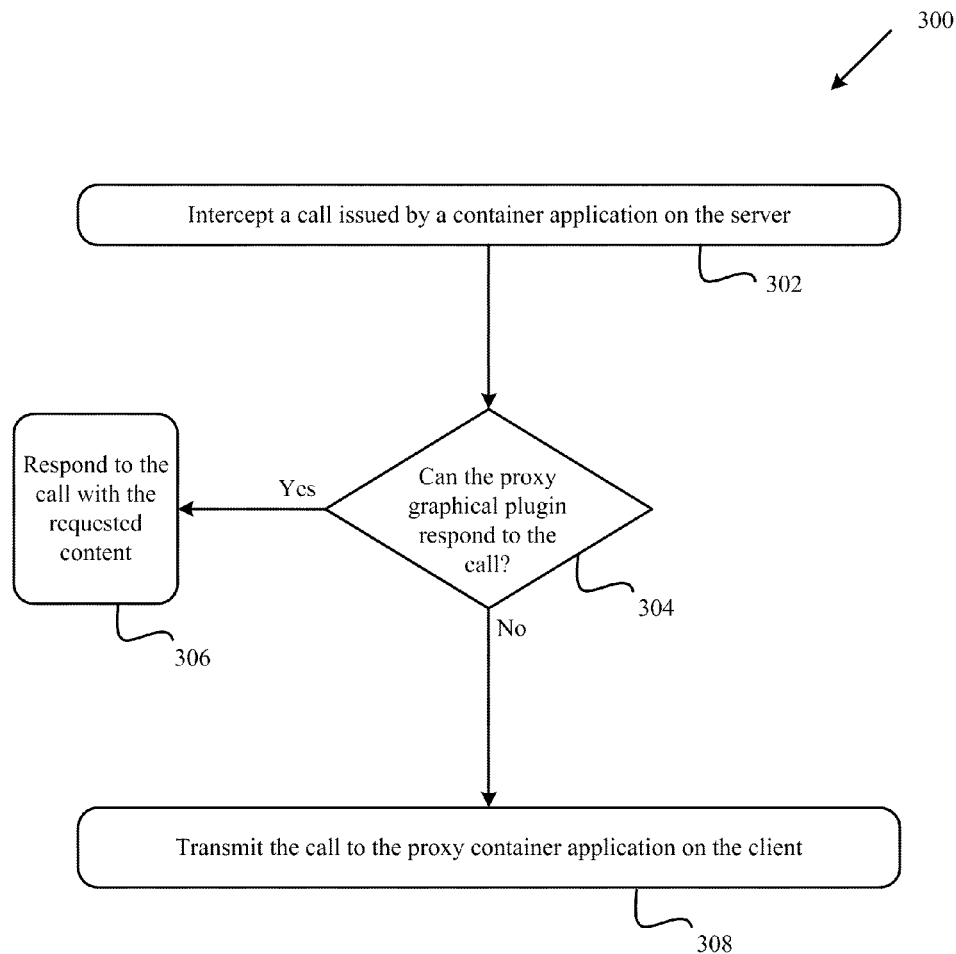
FIG. 3A illustrates a flow diagram depicting an embodiment of a process for remoting a call to a multimedia plugin.

Illustrated in FIG. 3A is an embodiment of a process 300 for remotely providing a call issued by a container application to a plugin. A proxy plugin 210 executing on the local computing machine 106 can intercept calls issued by a container application 205 executing on the local computing machine 106 (Step 302). Once a call is intercepted, the proxy plugin 210 can then determine whether the proxy plugin 210 can respond to the issued call (Step 304). If the proxy plugin 210 can respond to the issued call, then the proxy plugin 210 responds to the call with the requested content (Step 306). Otherwise, if the proxy plugin 210 cannot respond to the call, the proxy plugin 210 transmits the call to a proxy container application 235 executing on a remote computing machine 102 (Step 308).

Referring to FIG. 3A, and in more detail, in one embodiment the proxy plugin 210 can intercept calls issued by the container application 205 to the plugin 240 (Step 302). Calls issued by the container application 205 can include any of the following: a request for access to the plugin 240; a request to access a particular interface on the plugin 240; a request for graphical or multimedia content generated by the plugin 240; a request for access to a scrip executing within the plugin 240; or any other call or request requiring the plugin 240 to generate either content or a response to the call. In some embodiments the proxy plugin 210 can intercept the calls issued by the container application 205, while in other embodiments the container application 205 can issue the calls to a plugin 215 executing on the local computing machine 106. In this embodiment, the plugin 215 can then forward all calls to the proxy plugin 210. The proxy plugin 210, in other embodiments, can intercept the calls or requests issued by the container application 205 before they are received by the plugin 215. In this embodiment, the proxy plugin 210 can hook onto an application program interface on the container application 205 so that they proxy plugin 210 can intercept any calls issued by the container application 205.

Once the proxy plugin 210 intercepts the calls issued by the container application 205, the proxy plugin 210 then determines whether the proxy plugin 210 can respond to the call (Step 304). Determining whether the proxy plugin 210 can respond to a call can include reviewing the contents of cache 225 on the local computing machine 106 to determine whether a cached response has been saved on the local computing machine 106. The proxy plugin 210 can in some embodiments query a table to determine whether the proxy plugin 210 can respond. In such an embodiment, each time a response is saved in cache an entry is inserted into the table indicating the particulars of the call (i.e. the request, the requested plugin interface, metadata accompanying the request) and the memory location of the response. Reviewing this table can both instruct the proxy plugin 210 as to whether the proxy plugin 210 can respond to the call, and can inform the proxy plugin 210 where the response is located in cache (i.e. the response's memory location in cache). Using the retrieved memory location, the proxy plugin 210 can retrieve the response from cache 225 and respond to the container application 205 with the retrieved response (Step 306). In other embodiments, the proxy plugin 210 can determine whether the proxy plugin 210 can respond by searching through the cache 225 and retrieving the response once it is located. If a response is located, then the proxy plugin 210 can respond. Conversely, if a response is not found then the proxy plugin 210 cannot respond.

When the proxy plugin 210 determines that the proxy plugin 210 cannot respond, then the proxy plugin 210 can transmit the call to the proxy container application 235 (Step 308) executing on the remote computing machine 102. In some embodiments, transmitting the call to the proxy container application 235 can include transmitting the call over the virtual channel 255 to the client agent 230. The client agent 230 can then either relay or otherwise forward the call to the proxy container application 235, or in some embodiments, can forward the call to the plugin 240 executing on the remote computing machine 102. In some embodiments, transmitting the call to the proxy container application 235 includes compressing, encoding and/or encrypting the call prior to transmitting the call over the virtual channel 255.

Figure 3B:
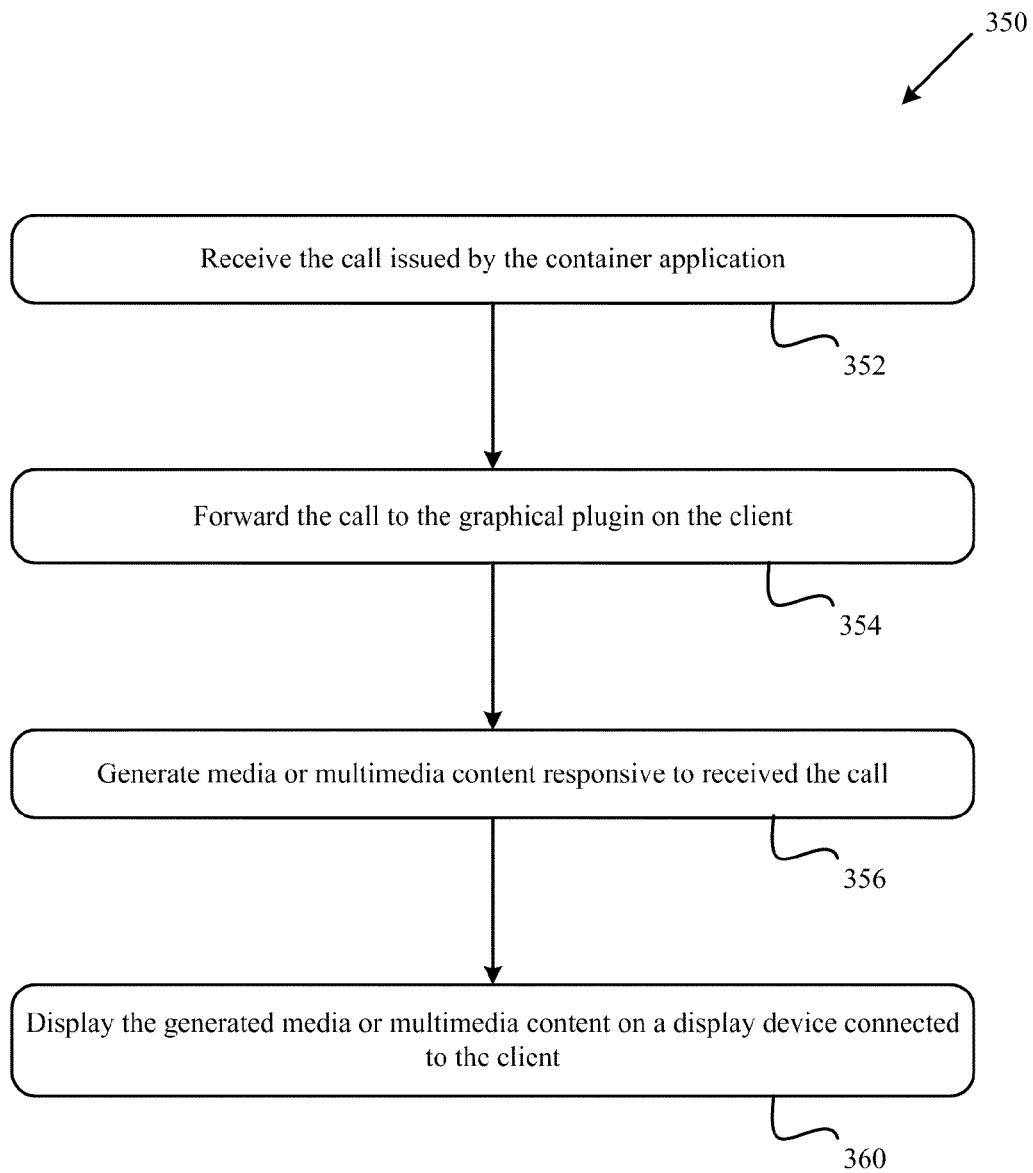
FIG. 3B illustrates a flow diagram depicting an embodiment of a process for responding to a remoted call to a multimedia plugin.

Illustrated in FIG. 3B is one embodiment of a process 350 for receiving a call issued to a plugin 240. A proxy container application 235 executing on the remote computing machine 102 can receive a call issued by the container application 205 (Step 352). This proxy container application 235 forwards the call to the graphical or multimedia plugin 240 executing on the remote computing machine 102 (Step 354). The graphical plugin responds to the call by generating media or multimedia content (Step 356) and the generated media or multimedia content is displayed on a display device connected to the remote computing machine 102 (Step 358).

Further referring to FIG. 3B, and in more detail, in one embodiment a proxy container application 235 executing on the remote computing machine 102 receives the call issued by the container application 205 (Step 352). In other embodiments, the client agent 230 receives the call issued by the container application 205. Once the client agent 230 receives the call, the client agent 230 forwards the call to the plugin 240 (Step 354). In some embodiments, the proxy container application 235 receives the call from the proxy plugin 210, while in other embodiments the proxy container application 235 receives the call from the client agent 230. The client agent 230 can receive the call from either the application/desktop delivery system 220 or the proxy plugin 210. Receiving the call can include receiving metadata associated with the call. In some embodiments, the proxy container application 235 forwards the call and the metadata to the plugin 240. In still other embodiments, receiving the call can include receiving a first call issued by the container application 205, while a subsequent received call can be referred to as a second call issued by the container application 205.

Once the proxy container application 235 receives the call, the proxy container application 235 can forward or issue the call to the graphical plugin 240 executing on the remote computing machine 102 (Step 354). When the call is received by the client agent 230, the client agent 230 can either forward or issue the call to the plugin 240 or forward the call to the proxy container application 235. In most embodiments, the proxy container application 235 forwards or issues the call to the plugin 240. The client agent 230, in some embodiments, decodes, decrypts and/or decompresses the call and any associated metadata prior to forwarding the call to either the proxy container application 235 or the plugin 240.

After the call is issued to the plugin 240, the plugin 240 processes the call and any associated metadata to generate either a response or content (Step 356). The content can include media content, graphical content, multimedia content, audio content or any other content requested by the container application 205. Generating a response can include responding with configuration information, security information, script output, or window data specific to the plugin 240. In most embodiments, the plugin 240 generates a response or content responsive to receiving the call.

The content generated by the plugin 240 can be displayed on a display device connected to the remote computing machine 102 (Step 360). In some embodiments, the plugin 240 displays the media or multimedia content within a plugin window or graphical output section or canvas positioned within the container application window. This container application window is further displayed on a display device connected to the remote computing machine 102. Thus, when the container application window containing the plugin window is displayed on the display device, the plugin window and generated media or multimedia content is also displayed on the display device connected to the remote computing machine 102. When the generated content is audio content, the content can be played by the remote computing machine 102 such that it is played through speakers connected to the remote computing machine 102.

Figure 4:
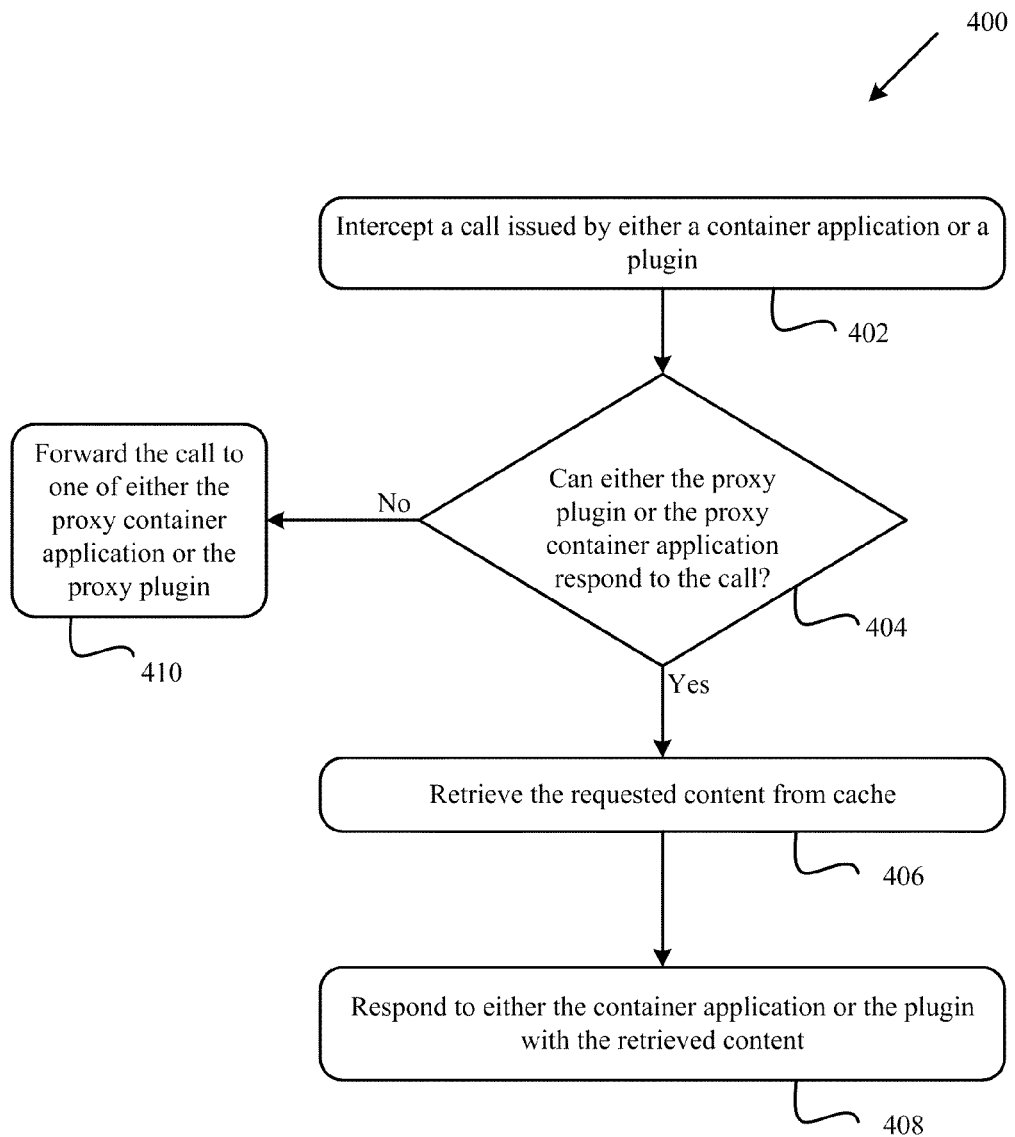
FIG. 4 illustrates a flow diagram depicting an embodiment of a process for responding to a call.

Illustrated in FIG. 4 is one embodiment of a method or process 400 for responding to call issued by either the container application 205 or the plugin 240. In one embodiment, the method 400 includes intercepting a call issued by either the container application 205 or the plugin 240 (Step 402). A determination is then made as to whether the proxy container application 235 or the proxy plugin 210 can respond to the intercepted call (Step 404). When neither the proxy container application 235 nor the proxy plugin 210 can respond to the call, then the call is forwarded to the appropriate proxy (Step 410). When either the proxy container application 235 or the proxy plugin 210 can respond to the call, then the requested content is retrieved from cache 225, 245 (Step 406) and the requested content is forwarded to either the container application 205 or the plugin 240 (Step 408).

Further referring to FIG. 4, and in more detail, in one embodiment a call issued by either the container application 205 or the plugin 240 is intercepted (Step 402). When the call is issued by the container application 205, the proxy plugin 210 intercepts the call. On the other hand, when the call is issued by the plugin 240, the proxy container application 235 intercepts the call. In some embodiments a separate application executing one either the local computing machine 105, the remote computing machine 102 or a third computing machine can intercept the call issued by either the container application 205 or the plugin 240. When a separate application intercepts the call, then the separate application can forward the call to either the proxy plugin 210 or the proxy container application 235.

Once the issued call is intercepted, then a determination is made as to whether the proxy plugin 210 or the proxy container application 235 can respond to the call (Step 404). This determination can be made by querying a table to determine whether a response to the issued call is stored in cache 225, 245. In instances where a response to the call issued by the plugin 240 is stored in cache 245 on the remote computing machine 102, a response can be returned to the proxy container application 235 indicating that the response resides in cache 245 and in some embodiments, also provides the location of the response in cache 245. Similarly, in instances where a response to the call issued by the container application 205 is stored in cache 225 on the local computing machine 106, a response can be returned to the proxy plugin 210 indicating that the response resides in cache 225 and in some embodiments, also provides the location of the response in cache 225. In one embodiment, the proxy plugin 210 can determine that a response to the call is present in cache 225 after searching through the cache 225 for the response. Similarly, in some embodiments the proxy container application 235 can determine that a response to the call is present in cache 245 after searching through the cache 245 for the response. In each of these embodiments, the proxy plugin 210 and the proxy container application 235 determine that they can respond to the call upon locating the response in cache 225, 245.

If a response is found or if a determination is made that the proxy plugin 210 or the proxy container application 235 cannot respond to the issued call, then the call is forwarded to the other of either the proxy container application 235 or the proxy plugin 210 (Step 410). If a determination is made that the proxy plugin 210 cannot respond to the call, then the call is forwarded to the client agent 230 which in some embodiments forwards the call to the proxy container application 235. When a determination is made that the proxy container application 235 cannot respond to the call, then the call in some embodiments, is forwarded to the proxy plugin 210.

If a determination is made that either the proxy plugin 210 or the proxy container application 235 can respond to the call, the requested content is retrieved from cache 225, 245 by either the proxy plugin 210 or the proxy container application 235 (Step 406). When a determination is made that the proxy plugin 210 can respond to the call issued by the container application 205, the proxy plugin 210 retrieves from cache 225 a response to the call issued by the container application 205. Similarly, when a determination is made that the proxy container application 235 can respond to the call issued by the plugin 240, the proxy container application 235 retrieves from cache 245 a response to the call issued by the plugin 240. In some embodiments the container application 205 or the plugin 240 issues a call, while in other embodiments they issue a request for information, or a request for access to an interface on the plugin 240 or the container application 205. In still other embodiments, the proxy plugin 210 and/or the proxy container application 235 can retrieve the requested content from cache 225, 245 by searching through cache for a particular memory location, or searching through cache 225, 245 for the expected content.

Once the requested content is retrieved from cache 225, 245 (Step 406), the requested content is forwarded to either the container application 205 or the plugin 240 (Step 408). Thus, if the proxy plugin 210 intercepts the call, determines that the proxy plugin 210 can respond to the call, and retrieves the requested content from cache 225; then the proxy plugin 210 can respond to the call issued by the container application 205 with the content retrieved from cache 225 (Step 408). Similarly, if the proxy container application 235 intercepts the call, determines that the proxy container application 235 can respond to the call, and retrieves the requested content from cache 245; then the proxy container application 235 can respond to the call issued by the plugin 240 with the content retrieved from cache 245 (Step 408).

In some embodiments the method 400 described in FIG. 4 can be referred to as short-circuiting the interface. This label refers to an attribute of the method 400 that allows a local proxy to respond to a call rather than transmitting the call to a remote computer able to respond to the call. Thus, rather than send a call issued by the container application 205 to the plugin 240 on the remote computing machine 102, the proxy plugin 210 can respond to the call by retrieving a response from cache 225 on the local computing machine 106. Similarly, the proxy container application 235 can respond to calls issued by the plugin 240 by retrieving a response from cache 245 on the remote computing machine 102. By implementing this process 400, the path of execution taken by an interface call is shortened thereby reducing the amount of traffic over the network 104 and therefore the virtual channel 255, and reducing the response time. Thus, the performance of both the container application 205 and the plugin 240 are increased because each time the response path is short-circuited, the resultant functionality is substantially similar to the functionality provided when the container application 205 and plugin 240 execute on the same computer.

In some embodiments, those responses stored in cache 225, 245 are the responses to frequently made calls. Thus, the proxy plugin 210, proxy container application 235, delivery system 220 or client agent 230 may choose to cache responses to calls that are made repeatedly over a particular period of time. Similarly, a decision may be made to drop certain calls when it is determined that the response to a subsequent call can undo the affect achieved by responding to the initial call. Such a determination can be made by reviewing the type of call or the type of interface requested by a call.

Figure 5:
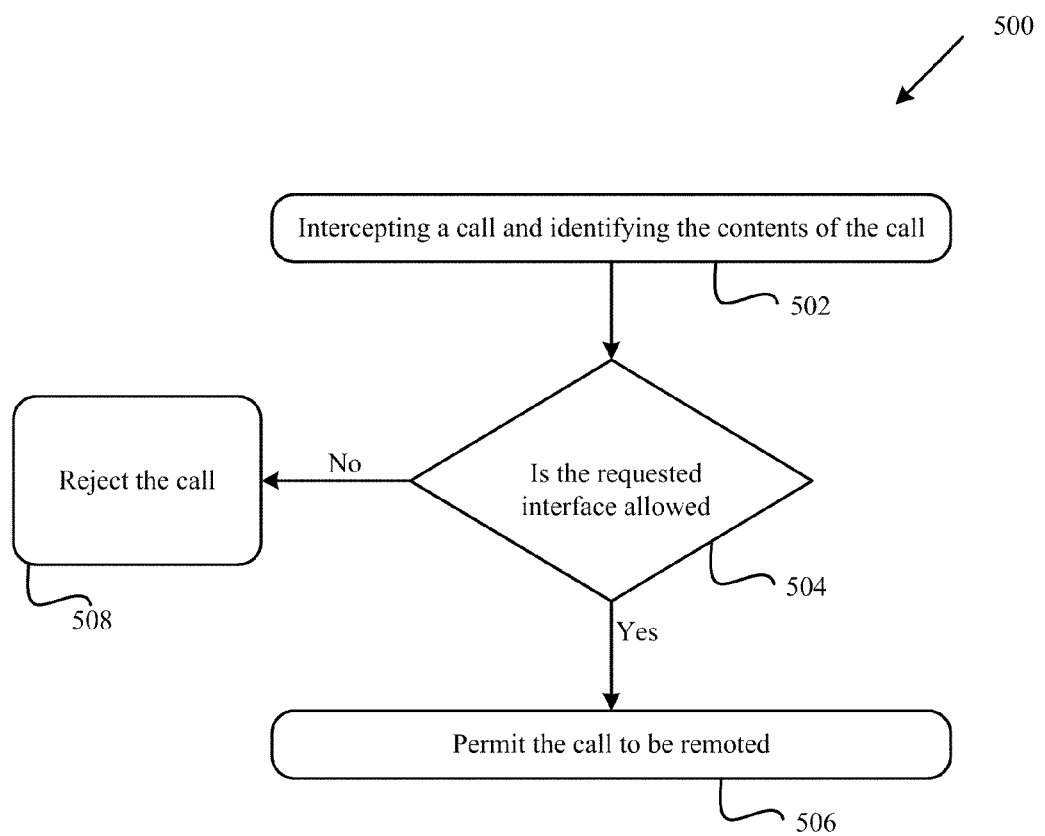
FIG. 5 illustrates a flow diagram depicting an embodiment of a process for permitting the remoting of a call to a plugin.

Illustrated in FIG. 5 is a method 500 for permitting the response to a call. A proxy plugin 210 or proxy container application 235 can intercept a call issued by a container application 205 or a plugin 240 and further determine the contents of the call (Step 502). If the interface requested by the proxy is allowed (Step 504), then the call is permitted (Step 506). If the requested interface is not allowed (Step 504), then the call is rejected (Step 508).

Further referring to FIG. 5, and in more detail, in one embodiment the proxy plugin 210 intercepts calls generated and issued by the container application 205 (Step 502). Similarly, the proxy container application 235 can intercept calls generated and issued by the plugin 240 (Step 502). Once either the proxy plugin 210 or the proxy container application 235 intercepts a call, then the proxy can review the call and determine the type of interface or content requested. In some embodiments, the type of requested interface can include determining a functionality associated with the requested interface. For example, the interface request may include requesting that a FLASH player execute a particular movie file or display a particular type of graphic. An initial review of the call can, in some embodiments, illuminate the type of functionality requested by the call. In other embodiments, a review of the call can include determining the contents of the call such as metadata included within the call.

Once the proxy identifies the contents of the call or the functionality requested by the call, the proxy 210, 240 can determine whether the requested interface is allowed (Step 504). Determining the permission level associated with a particular container application 205, plugin 240, computing machine or user can include reviewing a list or table of approved content or functionality. This table or list can identify content or functionality permitted for a particular user, computer, IP address, application, plugin, domain, or any other identifier used to identify a particular machine, user or application. If the requested functionality or content is permitted or allowed, per the permission table or list, then the call is permitted (Step 506), if the call is not allowed then the call is rejected (Step 508).

In one embodiment, the system includes a security agent (Not Shown) either within the proxy plugin 210 or proxy container 235, or an agent executing either on the local computing machine 106, the remote computing machine 102 or on a third computing machine executing on the network 104 and in communication with the local computing machine 106 and/or the remote computing machine 102. The security agent can, in some embodiments, intercept all calls issued by the container application 205 and/or the plugin 240 to determine whether the call is permitted or allowed. In some embodiments the security agent communicates with a permissions table or list stored in memory on either the local computing machine 106, the remote computing machine 102, or a third computing machine. When the security agent determines that the call is not permitted, the security agent can reject the call (Step 508) by not allowing it to be forwarded and by responding to the call with an error message indicating that the requested functionality or content is not allowed. In other embodiments, the security agent can respond to allowed functionality and content by forwarding the call along to either the proxy plugin 210 or the proxy container application 235.

In some embodiments, further security precautions are take by permitting the proxy plugin 210 to execute at the same integrity or security level as the plugin 240. Similarly, the proxy container application 235 can execute at the same integrity or security level as the container application 205.

Figure 6:
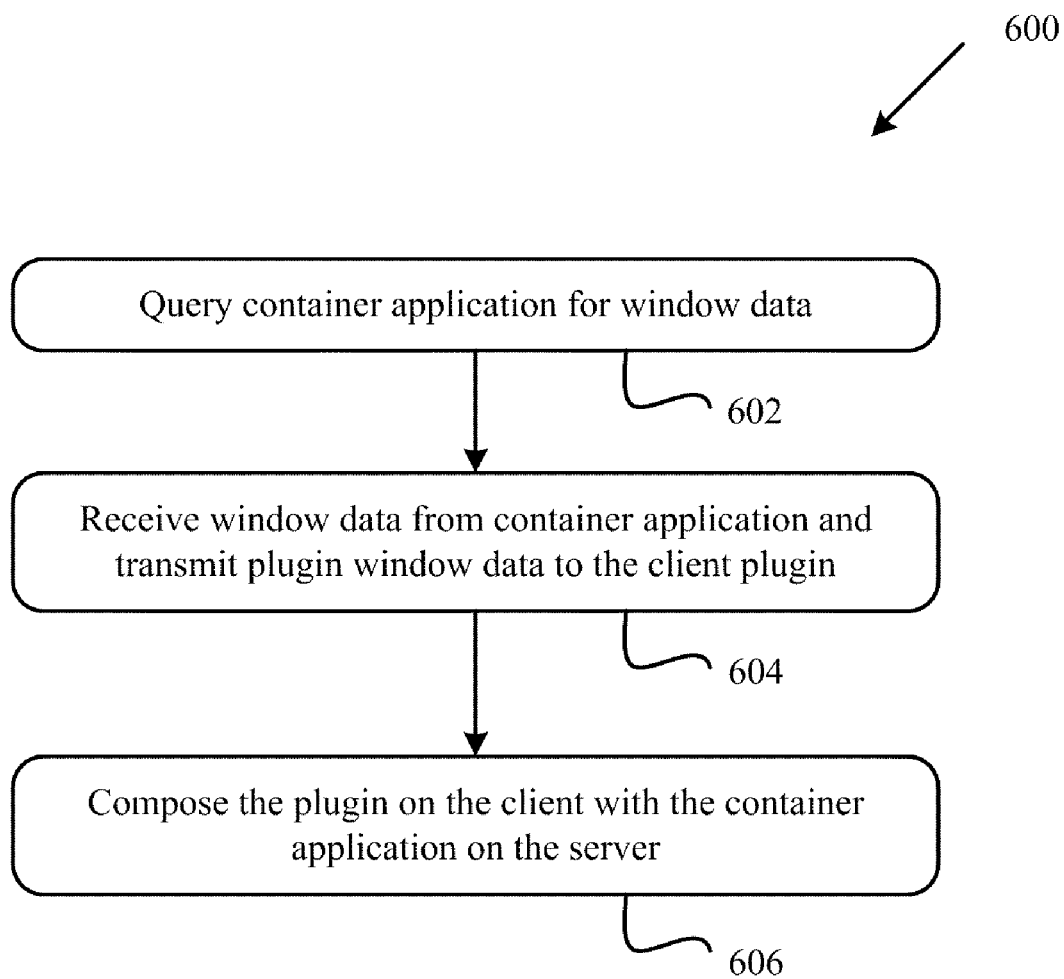
FIG. 6 illustrates a flow diagram depicting an embodiment of a process for obtaining and remotely providing plugin window data.

Illustrated in FIG. 6 is a method 600 for obtaining window data specific to a plugin window. The proxy plugin 210 can query either a container application 205 or an operating system executing on the local computing machine 106 for window data associated with the plugin 240 (Step 602). Upon receiving the window data from either the container application 205 or the operating system, the proxy plugin 210 transmits the plugin window data to the plugin 240 executing on the client, i.e. the remote computing machine 102 (Step 604). The plugin 240 then uses the window data to compose itself with the container application 205 (Step 606).

Further referring to FIG. 6, and in more detail, in one embodiment the proxy plugin 210 queries or requests from the container application 205 window data associated with the plugin 240 (Step 602). In some embodiments, the window data includes information about where within the container application 205 the plugin's graphical or multimedia content is displayed. When the container application 205 executes on the same machine as the plugin 240, the container application 205 and the plugin 240 are composed together such that the resulting graphic appears to be coming from the same source. For example, a web page that displays a FLASH player which plays a video can appear to the user as though the web page itself displays the video. In reality, the web page may simply draw a region within the web page for the graphical output of the FLASH player. The multimedia content generated by the FLASH player is displayed within the display region drawn or set-aside by the web page. Information associated with the graphical output region within the container application 205 can include the size of the graphical output region, the placement of the graphical output region, the clipping region of the graphical output region, and any other information that can be used to characterize the graphical output region within the container application 205.

In some embodiments the proxy plugin 210 queries the container application 205 for information while in other embodiments the proxy plugin 210 queries the operating system executing on the local computing machine 106. When the proxy plugin 210 receives window data from the operating system, the proxy plugin 210 may in some embodiments, utilize additional protocol commands to transmit the window data to the plugin 240 on the client or remote computing machine 102. One example of an application program interface call to the operating system on the local computing machine 106 includes issuing a GetWindowPosition( ) call which in most embodiments can result in receiving the plugin window's position on the screen. This application program interface call is issued to the operating system and not the container application 205.

In response to the proxy plugin 210 queries, the proxy plugin 210 can receive the window data from either the container application 205 or the operating system, and can transmit the received window data to the plugin 240 (Step 604). In some embodiments, the proxy plugin 210 stores the window data in cache 225 prior to transmitting the window data to the plugin 240. In other embodiments, the plugin 240 stores the window data in cache 245 upon receiving the window data. The proxy plugin 210 can, in some embodiments, transmit the window data across the virtual channel 255 using a presentation level protocol. In some embodiments, the proxy plugin 210 forwards the window data to the application/desktop delivery system 220 which then transmits the window data to the client agent 230. Upon receiving the window data the client agent 230 can, in some embodiments, store the window data in cache 245. In other embodiments, the client agent 230 can forward the window data to the proxy container application 235 which can then forward the window data to the plugin 240. Still other embodiments include a client agent 230 that forwards the window data directly to the plugin 240.

In one embodiment, once the plugin 240 receives the window data, the plugin 240 can compose itself with the container application 205 executing on the local computing machine 106 (Step 606). In other embodiments, the plugin 240 can compose itself with the proxy container application 235. Composing a plugin to a container application 205 can include configuring the plugin so that the graphical content is formatted to be displayed within an output region defined within the container application 205. The formatting can include altering the graphical content's resolution so that it may be displayed within the output region and so that it may not be clipped when it is displayed in the output region.

Figure 7:
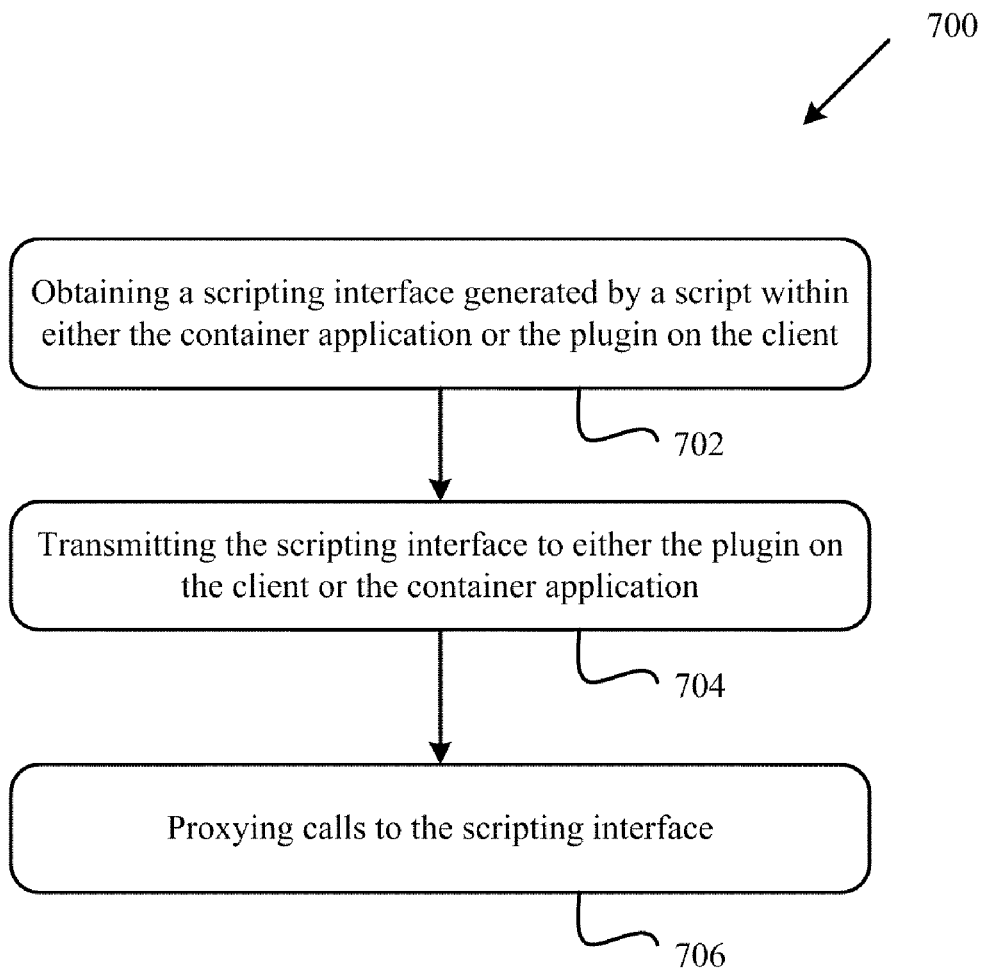
FIG. 7 illustrates a flow diagram depicting an embodiment of a process for remotely providing scripting interfaces.

Illustrated in FIG. 7 is an embodiment of a process 700 for obtaining a scripting interface. Either the proxy plugin 210 or the proxy container application 235 obtains a scripting interface generated by a script executing within the container application 205 or the plugin 240 (Step 702). Once the scripting interface is obtained, the scripting interface is transmitted to either the plugin 240 or the container application 205 (Step 704). Once the scripting interface is installed, the proxy plugin 210 and/or the proxy container application 235 can intercept calls to a scripting interface and further proxy the calls (Step 706).

Further referring to FIG. 7, and in more detail, in one embodiment the proxy plugin 210 obtains a scripting interface from the container application 205 (Step 702). Upon obtaining the scripting interface, the proxy plugin 210 transmits the scripting interface to the proxy container application 235 (Step 704) which receives the scripting interface and installs it within its architecture. By installing the scripting interface into the proxy container application's 235 interface, the proxy container application 235 can provide the plugin 240 with the ability to request access to the installed scripting interface. Installing the scripting interface can include altering the architecture of the proxy container application 235 binary so that the binary offers the plugin 240 the ability to call upon a particular scripting interface. Once the scripting interface is installed within the proxy container application 235 architecture, the proxy container application 235 can intercept calls to the scripting interface, and transmit the calls to the scripting interface on the container application 205 (Step 706).

Similarly, the proxy container application 235 can obtain a scripting interface from the plugin 240 (Step 702). Upon obtaining the scripting interface, the proxy container application 235 transmits the scripting interface to the proxy plugin 210 (Step 704) which receives the scripting interface and installs it within its architecture. By installing the scripting interface into the proxy plugin's 210 interface, the proxy plugin 210 can provide the container application 205 with the ability to request access to the installed scripting interface. Installing the scripting interface can include altering the architecture of the proxy plugin 210 binary so that the binary offers the container application 205 the ability to call upon a particular scripting interface. Once the scripting interface is installed within the proxy plugin 210 architecture, the proxy plugin 210 can intercept calls to the scripting interface, and transmit the calls to the scripting interface on the plugin 240 (Step 706).

In one embodiment, a scripting interface is generated by a script executing within either the container application 205 or the plugin 240. For example, Javascript code in a HTML page can call methods and properties on an ACTIVEX control hosted in the same HTML page by requesting access to the interfaces associated with the ACTIVEX control. This example illustrates a script executing within a container application 205 to issue a call from a scripting interface within the container application 205 to an interface on a plugin 240. Thus, while the above examples illustrate proxying calls to a scripting interface, in other embodiments calls issued by a scripting interface can be intercepted and transmitted to either the container application 205 or the plugin 240. Thus calls issued by a scripting interface can be proxied to a container application 205 or plugin 240.

Figure 8:
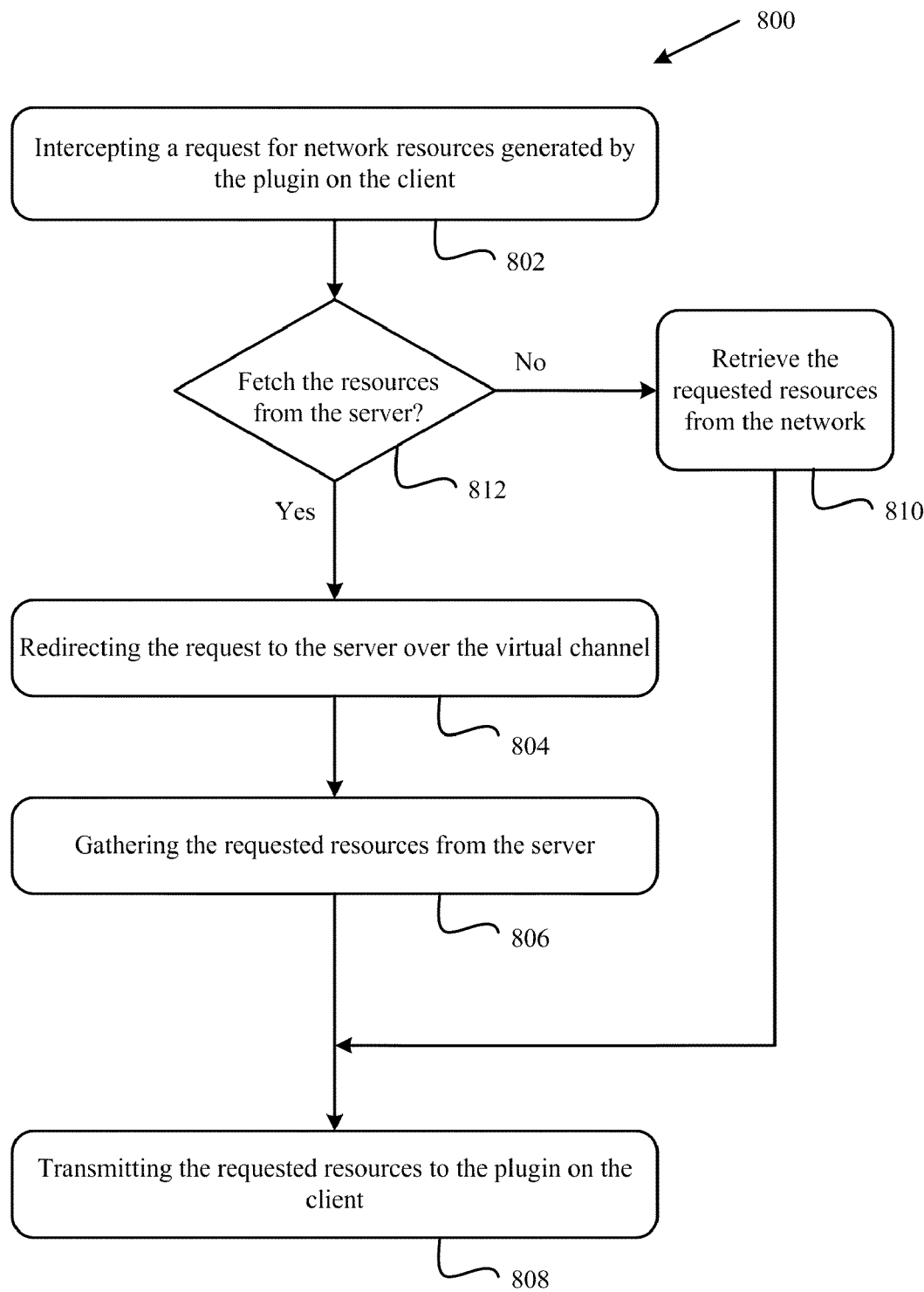
FIG. 8 illustrates a flow diagram depicting an embodiment of a process for obtaining network resources.

Illustrated in FIG. 8 is one embodiment of a method 800 for dynamically fetching network content. In one embodiment a request for network resources generated and issued by the plugin 240 is intercepted (Step 802). Once the request has been intercepted, a determination is made as to whether the resources should be fetched from the server 106 (Step 812). When a determination is made that the requested network resources should not be fetched from the server 106, then the network resources are retrieved or fetched from the network 104 (Step 810). When a determination is made that the requested network resources should be retrieved or fetched from the server 106, then the request is redirected to the server or local computing machine 106 over the virtual channel 255 (Step 804). Once the request is redirected to the local computing machine 106, the requested resources are gathered from the local computing machine 106 (Step 806) and the gathered resources are transmitted to the plugin 240 (Step 808).

Further referring to FIG. 8, and in more detail, in one embodiment the plugin 240 may require access to resources specific to the network on which the local computing machine 106 is located. In those embodiments, as well as in those embodiments where the plugin 240 requires downloading resources indirectly through the virtual channel 255, the plugin 240 can generate and issue a request for network resources (Step 802). In one embodiment this request can be intercepted by the proxy container application 235, while in other embodiments this request can be intercepted by the client agent 230. Still other embodiments can include another client, agent or module executing on the remote computing machine 102 either independently or as a process or subroutine within either the client agent 230 or proxy container application 235, to intercept network resource requests issued by the plugin 240. When this additional client, agent or module intercepts the resources request, the client, agent or module can determine whether to retrieve the resources directly from the network or through a call to the local computing machine 106. Intercepting the request for resources can include hooking an application interface call to the operating system on the remote computing machine 102. Hooking the application interface call can result in intercepting any requests made to access the network 104. In embodiments where it is determined that the resources should be retrieved from the local computing machine 106 via the virtual channel 255, the request is redirected to the local computing machine 106 over the virtual channel 255 (Step 804).

Once a request for network resources is intercepted, a determination is made as to whether the requested resources should be retrieved from the server 106 (Step 812). This determination can in many embodiments be dynamic such that the module carrying out the method 800 can determine whether to retrieve the requested resources from the server 106 by first trying to retrieve the network resources from the client 102. In such an embodiment, the module can try and access the desired network 104 in order to download or stream the requested network resources. Should the module fail to either access the network and/or download or stream the requested content, then the module can determine (Step 812) that the network resources should be downloaded or streamed from the server 106. In other embodiments, the module may determine that the network resources should be downloaded from the server 106 based in part on a review of type of requested resources. The module can, in some embodiments, have access to a database or table (Not Shown) on the client 102, where the database or table can list whether a particular network resource should be downloaded via the server 106 or directly from the network 104. For example, in some embodiments the list may indicate that any resources to-be-streamed should be streamed directly from the network 104. In this embodiment, the module can determine (Step 812) that the resources should not be fetched from the server 106 and the module retrieves or streams the network resources directly from the network 104 (Step 810). In still other embodiments, a configuration file accessible by the module can be used to determine whether a particular request or a particular set of resources should be retrieved from the server 106. Upon reviewing this configuration file, the module can make a determination as to whether the network resources should be downloaded from the server 106 or directly from the network 104 to the client 102. In still other embodiments, the determination as to whether network resources should be retrieved from the server 106 can be made by reviewing any of the following: the type of plugin 240 requesting the network resources; the type of requested resources; the user requesting the resources; the client 102 from which the user requests the resources; the amount of bandwidth available on the network; a transmit time associated with the amount of time required to transmit a request over the virtual channel 255 and receive a response; the number of user sessions executing on the server 106; whether the requested network resources are on a private network; whether the user and/or the client 102 have access to the network on which the network resources reside; and any other factor or parameter that can be used to dynamically determine whether to access network resources via the virtual channel 255 and server 106, or directly via the network 104. The determination (Step 812) can, in some embodiments, be based in part on a review of any of the previously mentioned factors or parameters.

When a determination is made not to access the resources via the server 106, the network resources are then retrieved directly from the network 104 via the client 102 (Step 810). The client 102 can, in this embodiment, retrieve the network resources directly from the network 104, download or stream the network resources to the client 102 and forward the requested resources to the plugin 240. In embodiments where the plugin 240 can retrieve the network resources directly from the network 104, the plugin 240 issues the request and the client agent 230 or another module such as the modules, clients, agents, sub-routines and processes described herein, can access the network and download or stream the requested resources to the plugin 240. In some embodiments the requested resources include a FLASH movie, in another embodiment the requested resources include FLASH video streams.

When a determination is made to access the resources via the server 106, the request is redirected to the local computing machine 106 (Step 804), the request can be received by any of the following: the proxy plugin 210; the application/desktop delivery system 220; a process or sub-routine executing within either the proxy plugin 210 or the application/desktop delivery system 220; a client, agent or module executing independently on either the local computing machine 106 or a third computing machine remotely located from but in communication with the local computing machine 106; or any other agent able to receive the request. Upon receiving the request, the network resources are retrieved from cache 225, a storage repository on the network 104, a third computing machine on the network 104, a storage repository on the local computing machine 106, or any other location able to store the requested resources. While in some embodiments the network resources are retrieved, in others they are gathered or obtained (Step 806).

Once the network resources are gathered (Step 806), they are then transmitted to the plugin 240. In some embodiments the client agent 230 receives the network resources and passes them along to the plugin 240.

While certain exemplary embodiments have been described and shown in the accompanying drawings, it is to be understood that such embodiments are merely illustrative of and not restrictive on the broad invention, and that the methods and systems described herein not be limited to the specific constructions and arrangements shown and described. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for enabling remote execution of multimedia plugin calls made by an application hosted on a server and remotely accessed by a user via a client, the method comprising:
   intercepting, by a proxy multimedia plugin executing on a server a call issued by a container application executing on the server, the call requesting content from a multimedia plugin executing on the server;
   determining, by the proxy multimedia plugin, whether the proxy multimedia plugin can respond to the call;
   transmitting the call, responsive to determining the proxy multimedia plugin cannot respond to the call, to a proxy container application executing on the client;
   transmitting, by the proxy container application, the call to a multimedia plugin executing on the client that corresponds to the proxy multimedia plugin;
   the corresponding multimedia plugin generating graphical content responsive to the transmitted call, and
   displaying the generated graphical content.

2. The method of claim 1, wherein transmitting the call further comprises transmitting the call by a delivery application executing on the server.

3. The method of claim 1, wherein displaying the graphical content further comprises displaying the graphical content in a plugin window on the client.

4. The method of claim 1, wherein requesting content from the multimedia plugin further comprises requesting access to a multimedia plugin interface within the multimedia plugin.

5. The method of claim 1, wherein transmitting further comprises transmitting over a virtual channel between the server and the client, via a presentation level protocol.

6. The method of claim 1, further comprising:
determining the proxy multimedia plugin can respond to the call; and responding, by the proxy multimedia plugin, to the container application call with the requested content.

7. The method of claim 6, wherein responding with the requested content further comprises responding to the call with content stored in cache on the server.

8. The method of claim 1, further comprising:
intercepting, by the proxy container application, a call issued by the multimedia plugin, the call requesting content from the container application; determining, by the proxy container application, that the proxy container application can respond to the issued call; and
responding, by the proxy container application, to the multimedia plugin call with the requested content.

9. The method of claim 8, wherein responding to the call with the requested content further comprises responding to the call with content stored in cache on the client.

10. The method of claim 1, wherein generating graphical content further comprises generating multimedia content.

11. The method of claim 1, wherein displaying graphical content further comprises displaying multimedia content.

12. The method of claim 1, wherein the multimedia plugin is a control, and the proxy multimedia plugin is a proxy control.

13. The method of claim 1, further comprising:
obtaining, by the proxy multimedia plugin, window data associated with the proxy multimedia plugin; and
transmitting, by the proxy multimedia plugin, the window data to the multimedia plugin on the client.

14. The method of claim 13, further comprising:
receiving, by the multimedia plugin, the transmitted window data; and altering, by the multimedia plugin, at least one interface between the multimedia plugin and the proxy container based on the received window data.

15. The method of claim 1, further comprising:
obtaining, by the proxy multimedia plugin, a scripting interface generated by a script within the container application; and
transmitting, by the proxy multimedia plugin, the scripting interface to the proxy container application.

16. The method of claim 1, further comprising:
obtaining, by the proxy container application, a scripting interface generated by a script within the multimedia plugin; and
transmitting, by the proxy container application, the scripting interface to the proxy multimedia plugin.

17. The method of claim 1, wherein intercepting a call further comprises intercepting a call for a scripting interface.

18. The method of claim 1, further comprising:
accessing, by the multimedia plugin, network resources via a browser application executing on the client; and
downloading to the multimedia plugin the accessed network resources.

19. The method of claim 1, further comprising:
intercepting a request for network resources generated by the multimedia plugin;
redirecting the request to the server over a virtual channel between the client and the server and via a presentation level protocol;
receiving the requested resources from the server; and
forwarding the received resources to the multimedia plugin.

20. A system for enabling remote execution of multimedia plugin calls made by an application hosted on a server and remotely accessed by a user to via a client, the system comprising:
a server executing a container application and a proxy multimedia plugin, the proxy multimedia plugin corresponding to a multimedia plugin executing on a client;
the proxy multimedia plugin:
intercepting a call issued by the container application, the call requesting content from the multimedia plugin,
determining whether the proxy multimedia plugin can respond to the call,
transmitting the call, responsive to determining the proxy multimedia plugin cannot respond to the call, to a proxy container application executing on the client;
transmitting the call, by the proxy container application to the multimedia plugin that corresponds to the proxy multimedia plugin; and
the multimedia plugin receiving the call, generating graphical content responsive to receiving the call, and displaying the graphical content.

21. The system of claim 20, further comprising a delivery application executing on the server, and transmitting the call to the multimedia plugin.

22. The system of claim 20, wherein multimedia plugin displays the graphical content in a plugin window on the client.

23. The system of claim 20, wherein the container application requests access to a multimedia plugin interface within the multimedia plugin.

24. The system of claim 20, wherein the proxy multimedia plugin transmits the call over a virtual channel between the server and the client, via a presentation level protocol.

25. The system of claim 20, wherein the proxy multimedia plugin:
determines the proxy multimedia plugin can respond to the call; and responds to the container application call with the requested content.

26. The system of claim 25, wherein the proxy multimedia plugin responds to the call with content stored in cache on the server.

27. The system of claim 20, wherein the proxy container application:
intercepts a call issued by the multimedia plugin requesting content from the container application;
determining that the proxy container application can respond to the issued call; and responding to the multimedia plugin call with the requested content.

28. The system of claim 27, wherein the proxy container application responds to the call with content stored in cache on the client.

29. The system of claim 20, wherein the multimedia plugin generates multimedia content.

30. The system of claim 20, wherein the multimedia plugin displays multimedia content.

31. The system of claim 20, wherein the multimedia plugin is a control, and the proxy multimedia plugin is a proxy control.

32. The system of claim 20, wherein the proxy multimedia plugin:
obtains window data associated with the proxy multimedia plugin; and transmits the window data to the multimedia plugin on the client.

33. The system of claim 32, wherein the multimedia plugin:
receives the transmitted window data; and alters at least one interface between the multimedia plugin and the proxy container based on the received window data.

34. The system of claim 20, wherein the proxy multimedia plugin: obtains a scripting interface generated by a script within the container application; and transmits the scripting interface to the proxy container application.

35. The system of claim 20, wherein the proxy container application:
obtains a scripting interface generated by a script within the multimedia plugin; and transmits the scripting interface to the proxy multimedia plugin.

36. The system of claim 20, wherein the proxy multimedia plugin intercepts a call for a scripting interface.

37. The system of claim 20, wherein the multimedia plugin:
accesses network resources via a browser application executing on the client; and downloads to the multimedia plugin the accessed network resources.

38. The system of claim 20, further comprising a client agent executing on the client to:
intercept a request for network resources generated by the multimedia plugin;
redirect the request to the server over a virtual channel between the client and server and via a presentation level protocol;
receive the requested resources from the server; and
forward the received resources to the multimedia plugin.

* * * * *

UNITED STATES PATENT AND TRADEMARK OFFICE
CERTIFICATE OF CORRECTION

| | | |
|---|---|---|
| PATENT NO. | : 8,296,357 B2 | Page 1 of 1 |
| APPLICATION NO. | : 12/468797 | |
| DATED | : October 23, 2012 | |
| INVENTOR(S) | : Stone et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 521 days.

Signed and Sealed this
Second Day of September, 2014

Michelle K. Lee
*Deputy Director of the United States Patent and Trademark Office*